United States Patent
Tamura et al.

(10) Patent No.: US 8,219,882 B2
(45) Date of Patent: *Jul. 10, 2012

(54) MEMORY CARD AND MEMORY CONTROLLER

(75) Inventors: Takayuki Tamura, Higashiyamato (JP); Hirofumi Shibuya, Tokyo (JP); Hiroyuki Goto, Higashimurayama (JP); Shigemasa Shiota, Tachikawa (JP); Yasuhiro Nakamura, Tachikawa (JP)

(73) Assignees: Renesas Electronics Corporation, Kawasaki-shi (JP); Hitachi ULSI Systems Co., Ltd., Tokyo (JP)

( * ) Notice: Subject to any disclaimer, the term of this patent is extended or adjusted under 35 U.S.C. 154(b) by 1085 days.

This patent is subject to a terminal disclaimer.

(21) Appl. No.: 12/125,042

(22) Filed: May 21, 2008

(65) Prior Publication Data

US 2008/0229164 A1    Sep. 18, 2008

Related U.S. Application Data

(63) Continuation of application No. 11/180,538, filed on Jul. 14, 2005, now Pat. No. 7,392,457, which is a continuation of application No. 10/082,291, filed on Feb. 26, 2002, now Pat. No. 6,931,582.

(30) Foreign Application Priority Data

Aug. 9, 2001    (JP) .................................. 2001-241929

(51) Int. Cl.
    *G11C 29/00*    (2006.01)
(52) U.S. Cl. .......................... 714/763; 714/773; 365/201
(58) Field of Classification Search .................. 714/763, 714/773; 365/201
    See application file for complete search history.

(56) References Cited

U.S. PATENT DOCUMENTS

| | | | |
|---|---|---|---|
| 4,493,081 A * | 1/1985 | Schmidt ........................ | 714/754 |
| 5,357,473 A * | 10/1994 | Mizuno et al. ................. | 365/201 |
| 5,532,962 A | 7/1996 | Auclair et al. | |
| 5,724,285 A | 3/1998 | Shinohara | |
| 5,732,092 A | 3/1998 | Shinohara | |
| 5,848,076 A | 12/1998 | Yoshimura | |
| 6,040,997 A | 3/2000 | Estakhri | |
| 6,049,899 A | 4/2000 | Auclair et al. | |
| 6,101,614 A | 8/2000 | Gonzales et al. | |
| 6,125,424 A * | 9/2000 | Komatsu et al. .............. | 711/103 |
| 6,151,246 A * | 11/2000 | So et al. ................... | 365/185.09 |
| 6,185,134 B1 | 2/2001 | Tanaka | |
| 6,256,762 B1 | 7/2001 | Beppu | |
| 6,339,546 B1 * | 1/2002 | Katayama et al. ........ | 365/185.09 |
| 6,751,123 B2 | 6/2004 | Katayama et al. | |
| 6,810,490 B2 | 10/2004 | Sassa et al. | |

FOREIGN PATENT DOCUMENTS

| | | |
|---|---|---|
| JP | 02-083645 A | 3/1990 |
| JP | 2-83645 A | 3/1990 |
| JP | 9-204367 A | 8/1997 |
| WO | WO 01/22232 | 3/2001 |

\* cited by examiner

*Primary Examiner* — M. Mujtaba K Chaudry
(74) *Attorney, Agent, or Firm* — Miles & Stockbridge P.C.

(57) ABSTRACT

A memory card includes a non-volatile memory, a memory controller for controlling the operation of the memory card. The memory controller is capable of providing an interface with outside according to a predetermined protocol, and performs error detection and correction of the memory information at regular time intervals or at the timing of connection of electric power supply, independently of reading out the memory information according to external access request. Therefore, it is possible to improve reliability of data retention in the non-volatile memory without the host device reading out the memory information from the non-volatile memory of the memory card.

11 Claims, 9 Drawing Sheets

MEMORY CARD AND MEMORY CONTROLLER

CROSS-REFERENCE TO RELATED APPLICATION

This application is a continuation of application Ser. No. 11/180,538 filed Jul. 14, 2005 now U.S. Pat. No. 7,392,457, which is a continuation of application Ser. No. 10/082,291 filed Feb. 26, 2002, now U.S. Pat. No. 6,931,582 issued Aug. 16, 2005.

BACKGROUND OF THE INVENTION

The present invention relates to a memory card carrying a non-volatile memory, and a memory controller applied to a non-volatile memory card. For example, the present invention relates to a technique effective for improvement in reliability of memory information when applied to a flash memory carrying memory card interchangeable with a hard disk.

In a memory card using an electrically erasable and writable non-volatile memory such as a flash memory, an ECC circuit is mounted in a memory controller so as to generate an error correction code when writing data in a non-volatile memory to perform the error detection and correction by using the error correction code when reading out the data from the non-volatile memory. In this manner, in a memory device using the conventional flash memory, the verification for the data error generation in the data which is written in a flash memory by a host compute is performed by the host computer only when it reads out the data.

Therefore, in the conventional memory card, the data error due to the flash memory retention or the like is not corrected until the data is read out by the host computer. The non-volatile memory cell such as a flash memory stores information as variation of a threshold voltage of a transistor. This characteristic of the non-volatile memory cell may deteriorate by aging and also by external factors such as ultraviolet rays. Therefore, it is possible that the data error extends to the bit number larger than the correctable number when the host computer reads out the data from the flash memory. The inventors of the present invention have found that it is desired for improvement in reliability of the memory information to actively carry out the verification of all data stored in a flash memory and to conduct efficiently rewriting of the corrected data.

SUMMARY OF THE INVENTION

An object of the present invention is to provide a memory card capable of improving reliability for data retention in a non-volatile memory without a host device reading out memory information from a non-volatile memory in a memory card.

Another object of the present invention is to provide a memory controller capable of improvement in reliability for data retention of a non-volatile memory in a memory card without charging a burden on a host device.

The summary of typical embodiments of the present invention as disclosed will be briefly explained as follows:

[1] A memory card according to the present invention includes a non-volatile memory (2), and a memory controller (4) for controlling operation of the non-volatile memory. The memory controller is capable of interfacing with outside according to a predetermined protocol, and controls a process of adding an error correction code to data written in the non-volatile memory from outside or a process of error detection and correction by using the error correction code to data read out from the non-volatile memory to outside, in a memory control responsive to an external access instruction, and also controls a process of error detection and correction by using the error correction code to memory information of the non-volatile memory, independently of the process responsive to the external access instruction. In short, the memory controller performs the error detection and correction to the memory information independently of reading out the memory information to outside in response to the external access request. Therefore, it is possible to improve reliability for data retention by the non-volatile memory without a host device reading out the memory information of the non-volatile memory in the memory card.

With respect to the process of error detection and correction independent of the process responsive to the external access instruction, this process may be carried out by operation control means of the memory controller at predetermined time intervals or in response to connection of electric power supply to the memory card. The former may be carried out by using timer counter means of the operation control means. The latter may be carried out as the initializing operation at the connection of the electric power supply.

In the above error detection and correction process, the possibility of the uncorrectable error generation becomes much larger, as the number of corrections or the number of error generation times becomes larger. In order to take care of the matter before the correction becomes impossible, it is required to use operation control means for changing a memory area for the error-corrected memory information when the number of error generation times exceeds a predetermined value. From the same point of view, the operation control means may be arranged such that the memory area for the error-corrected memory information is changed when the number of the error-generated bits exceeds a predetermined value.

The non-volatile memory is used in such as a file memory system having the hard-disk interchangeability, and includes, as information memory areas, a data area, a substitution area substituted for defective part of the data area, a substitution managing area for corresponding the data area to the substitution area, and a parameter area. In this case, the operation control means gets information of the predetermined number of times or the predetermined number of bits from the parameter area of the non-volatile memory. In short, the information of the predetermined number of times used for the error detection and correction process is held in non-volatile manner in the parameter area so that the information is not lost even at stoppage of the power supply.

Further, if the number of the error generation times generated in the error detection and correction process is recorded in the corresponding data area of the non-volatile memory by the operation control means, the information management of the error generation times in each predetermined memory area such as a sector unit is made easy.

The operation control means is readily composed of a program-controlled data processor or the like.

[2] A memory controller according to the present invention includes a host interface circuit (10) capable of conducting input and output operation according to a predetermined protocol, a memory interface circuit (12) connectable to a non-volatile memory (2), and a control circuit (11, 13 and 14) connected to the host interface circuit and the memory interface circuit. The control circuit is capable of controlling a first process of outputting data, which is obtained by adding an error correction code to write-data inputted from the host interface circuit, together with write-control information from the memory interface circuit, a second process of outputting data which is obtained by applying error detection and correction to read-data inputted to the memory interface circuit according to read-control information outputted from the memory interface circuit, from the host interface circuit, and a third process of outputting the data, which is obtained by applying the error detection and correction to the read-data inputted to the memory interface circuit according to read-control information outputted from the memory interface circuit, together with the write-control information from the memory interface circuit. This memory controller is mounted on a circuit board in which the memory interface circuit is connected with the non-volatile memory, and is connected to a host device through the host interface circuit. According to this memory controller, it is possible to apply the error detection and correction to the memory information in the non-volatile memory independently of the read-control operation in which the memory information read out from the memory interface circuit according to an access request from the host interface circuit is outputted to the host interface circuit. Therefore, it is possible to improve reliability in data retention in the non-volatile memory without the host device reading out the data from the non-volatile memory.

The third process may be performed by the operation control means (11) in the control circuit at predetermined time intervals or in response to the connection of electric power supply to the memory controller.

In the third process, the operation control means outputs the write-control information for changing a memory area of the error-corrected read-out data when the number of error generation times exceeds a predetermined value. From the same point of view, the write-control information for changing the memory area of the error-corrected read-out data may be outputted when the error-generation bit number of exceeds a predetermined value.

The operation control means inputs the information of the predetermined number of times from the memory interface circuit when the memory interface circuit inputs the read-data. Similarly, the operation control means may input the information of the predetermined number of bits from the memory interface circuit when the memory interface circuit inputs the read-data. Since the information of the predetermined number of times used for the error detection and correction and the like are stored in the non-volatile memory connected to the memory interface circuit, the information of the predetermined number of times is not lost even at the stoppage of the electric power supply to the memory controller. Further, the operation control means outputs the generation number of the errors generated in the error detection and correction at the second or third process, together with the write-control information from the memory interface circuit. Since the generation number of the errors generated in the detection and correction process is recorded in the corresponding data area of the non-volatile memory, it is possible to make easy the information management for the error-generation number in each predetermined memory area such as a unit of sector.

The control circuit may be provided with an ECC circuit (14) used for generation of the error correction code and the error detection and correction.

[3] According to a further detailed aspect of the present invention, a memory card includes a non-volatile memory such as a plurality of flash memories, an interface circuit for a host computer, an interface circuit for the flash memory, a controller for operating data transfer between the host computer and the flash memory and for controlling error detection and correction, and a data buffer used for the data transfer. The controller measures a period of time (idle time) during which the host computer does not access to the flash memory, and when the idle time exceeds a predetermined time interval, reads out all data stored in the flash memory by a unit of sector (a data area of predetermined byte number) into the data buffer, and performs an error check. Also, at the connection of electric power supply or when the host computer instructs to perform data verification by using a command, the error check is also applied to data stored in the flash memory. When an error is detected in the read-out data, the error correction is performed and the corrected data is rewritten into the flash memory. In this case, the data is rewritten into the flash memory in any of various modes as follows: (a) The number of errors as previously generated is measured, and when the measured number is equal to or smaller than a predetermined value, the data is rewritten into the same area as stored previously, and when the measured number is larger than the predetermined value, the data is rewritten into a different area. (b) The data is rewritten into the same area or a different area depending on the degree of errors as generated (for example, when the errors are generated at three or more locations, the data is rewritten into a different area). (c) The data is always rewritten into the same area. (d) The data is always rewritten into a different area. It is possible to use selectively any one or combination of the above four rewriting modes.

It is possible to hold the data reliability by carrying out the verification of the data stored in the flash memory (regardless of the operation of the host computer) to detect the variation of data (such as retention error) produced by aging, and to rewrite the data into the flash memory after correcting the error. Further, since it is possible to correct the variation of data by aging and hold the data at normal condition by conducting the data verification at regular time intervals, the data reliability can be secured. Even in the case of using a flash memory which is very likely to suffer from the data variation due to aging, it is possible to secure the data reliability by performing the data verification at regular time intervals.

The above and other objects and features of the present invention will be apparent from the following description with reference to the accompanying drawings.

DESCRIPTION OF THE EMBODIMENTS

Figure 1:
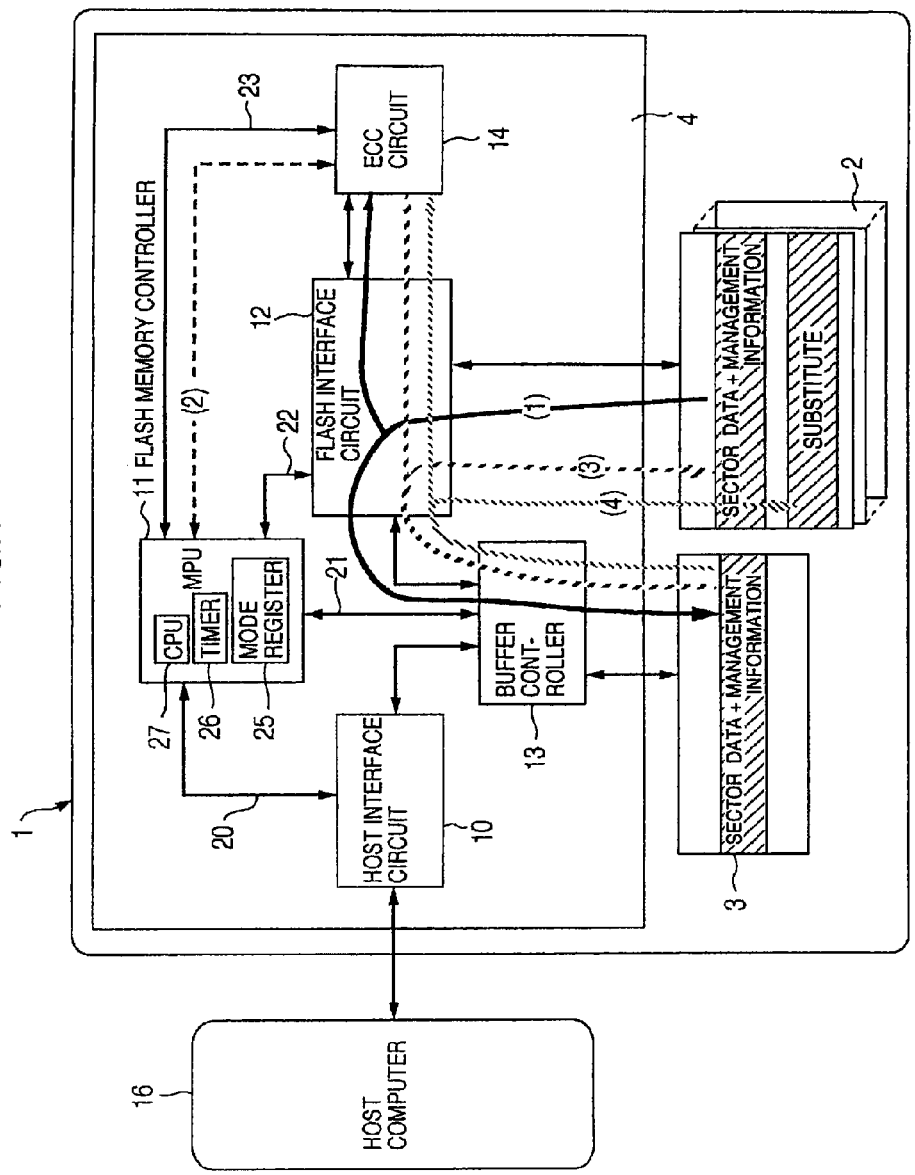
FIG. 1 is a block diagram showing one example of a memory card according to the present invention.

FIG. 1 shows one example of a memory card according to the present invention. A memory card 1 includes a non-volatile memory such as a flash memory 2, a data buffer 3 including a DRAM (Dynamic Random Access Memory) or SRAM (Static Random Access Memory), and a memory controller 4 (also referred to a "flash memory controller") for controlling the memory operation of the flash memory 2 and the data buffer 3, all of which are assembled on a substrate. The flash memory 2 is prepared, for example, in a form of a plurality of flash memory chips depending on the memory capacity as required for the memory card.

The flash memory 2 includes a large number of non-volatile memory cell transistors which are electrically erasable and writable. The memory cell transistor (also referred to a "flash memory cell") includes, but not limited to, a source and a drain formed in a semiconductor substrate or well, a floating gate formed on a channel region between the source and the drain through a tunnel oxide film, and a control gate laminated on the floating gate through an interlayer insulating film. The control gate, the drain and the source are connected to a word line, a bit line and a source line, respectively. The threshold voltage of the memory cell transistor rises as electrons are injected in the floating gate, and falls as the electrons are drawn from the floating gate. The memory cell transistor stores information corresponding to the magnitude of the threshold voltage relative to a word line voltage (voltage applied to the control gate) used for reading out data. Although not limited to, we call in the specification the lower condition of the threshold voltage as an erased state, and the higher condition as a written state. When the data is written or erased, the process of verification is performed to determine whether the threshold voltage reaches the erased state or the written state. The erased state and the written state are controlled by the condition of voltages applied to the word line, the source line, the bit line and the substrate. The control procedure is well known, and hence its detailed explanation is omitted.

The flash memory controller 4 has an access control function by which the flash memory 2 is accessed according to, for example, the IDE disk interface specification. When the flash memory 2 is accessed by this access control function, an error code is added to write-data by the ECC function, and an error detection and correction is applied to read-data. The flash memory controller 4 has also a substitution control function by which when data is written in the flash memory 2 according to the access control function and a writing error is detected by the write verification process, the defective area is substituted by a substitution area. Further, the flash memory controller 4 has a memory information verification function by which the error detection and correction process is applied to the memory information of the flash memory 2 independently of that applied by the access control function when reading-out the data, thereby increasing the reliability of the memory information. This memory information verification function is effective as a function to realize the error correction function by a disk scan, which is performed to a disk area by an OS (operating system) of a computer, by the memory card 1 itself.

The flash memory controller 4 includes a host interface circuit 10, a microprocessor (MPU) 11 effective as operation control means, a flash interface circuit 12 effective as a memory interface circuit, a buffer controller 13, and an ECC circuit 14. The MPU 11, the buffer controller 13 and the ECC circuit 14 constitute a control circuit for the flash memory controller 4.

The MPU 11 includes a CPU (Central Processing Unit) 27, a mode register 25, a timer 26 and a program memory (not shown), and controls the memory controller 4 in the whole. The program memory holds an operation program of the CPU 27 and the like.

The host interface circuit 10 acts as an interface to a host computer 16 such as a personal compute or a work station according to a predetermined protocol of ATA (Attachment), IDE (Integrated Device Electronics), SCSI (Small Computer System Interface) or the like. The control of the host interface operation is carried out by the MPU 11 through an access bus 20. The above protocol is well known, and hence detailed explanation thereof is omitted.

The buffer controller 13 controls the memory access operation of the data buffer 3 according to an access instruction supplied from the MPU 11 through an access bus 21. The data buffer 3 temporarily stores data inputted from the host computer 16 to the host interface circuit 10, or data outputted from the host interface circuit 10 to the host computer 16. The data buffer 3 temporarily holds data read out of the flash memory 2, or data to be written into the flash memory 2.

The flash interface circuit 12 controls the reading operation, the writing operation and the erasing operation applied to the flash memory 2 according to an access instruction supplied from the MPU 11 through the access bus 22. The flash interface circuit 12 outputs to the flash memory 2 read-control information such as a read-command code and read-address information in the reading operation, and outputs to the flash memory 2 write-control information such as a write-command code and write-address information in the writing operation, while outputs to the flash memory 2 erase-control information such as an erase command in the erasing operation.

As the access control function, the ECC circuit 14 generates an error correction mark (error correction code) for the data to be written in the flash memory 2 according to a command supplied from the MPU 11 through an access bus 23, and outputs it to the flash interface circuit 12 in order to add it to the write-data. Further, the ECC circuit 14 performs the error detection and correction process to the read-data, which is read out from the flash memory 12, by using the error correction code added thereto to conduct the error correction to the errors within its correcting capacity. Further, as the memory information verification function, the ECC circuit 14 performs the error detection and correction process to the data which is read out from the flash memory, independently of the process responsive to the access instruction from the host computer 16 to generates the error correction code used when the corrected data is rewritten to the flash memory 2. When rewriting, the substitution area may be used similarly as the case of the substitution control function. Next, the memory information verification function will be explained in detail.

Figure 2:
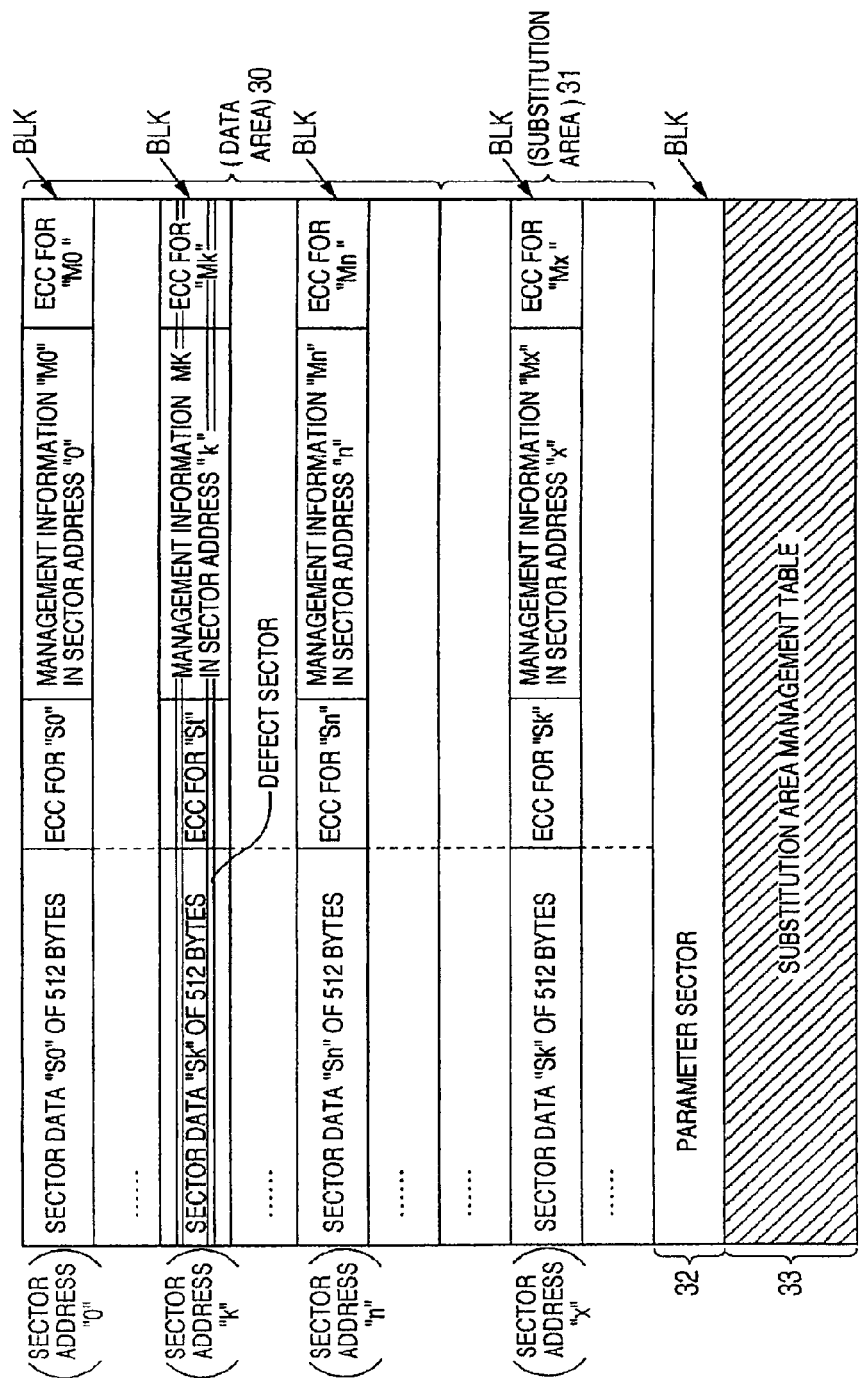
FIG. 2 shows exemplarily a memory area of a flash memory.

FIG. 2 shows exemplarily the memory area of the flash memory 2. The memory area of the flash memory 2 is generally separated into a data area 30, a substitution area 31, a parameter sector 32 effective as a parameter area, a substitution area management table 33 effective as a substitution management area. Although not limited to, each of the areas 30-33 has, as a unit area BLK, a format area including a sector data Sn of 512 bytes, an ECC code (error correction code) of plural bytes for the sector data Sn, a management information Mn for the sector, and an ECC code for the management information Mn. Each of the unit area BLK is provided with a memory area for redundancy relief as a part of redundancy used for relief of defects generated at the device process stage of the flash memory 2. When the redundancy relief is carried out, a mapping is applied to an address to which the relief is applied, and when no redundancy relief is carried out, no address mapping is applied.

The data area 30 is an area opened to a user. When the write error is generated due to aging in the data area 30 or the like, the unit area BLK of the data area 30 or the like where the error is generated is substituted with the substitution area 31. The unit area BLK is the smallest unit used for substitution.

As the management information Mn, there are stored a defection flag showing that the concerned sector address is defective, data (error generation frequency data) showing the number of error generation times, and corresponding information to the logic address specified by the host.

The substitution area management table 33 includes, but not limited, defect registration data corresponding to the unit area BLK of the data area. This defect registration data is deemed as substitution address information which specifies the address of the substitution unit area, and is defined as an offset address from the substitution-area head address. The correspondence between the defect registration data and the unit area BLK is definitive as the one-to-one correspondence. Therefore, it is possible to obtain the corresponding defect registration data by conducting the address calculation based on the physical address of the unit area BLK. For example, if the defect address "k" is substituted with a sector address "x" when the sector address "k" is defective, the offset address of the substitution sector "k" is set as the defect registration data corresponding to the defect sector address "k".

In the parameter sector 32, parameter data used for the memory information verification function is stored. The parameter data includes, but not limited to, a first enable bit instructing whether or not the memory information verification process is to be carried out at the connection of electric power supply, a second enable bit instructing whether or not the memory information verification process is to be carried out at regular time intervals, time data defining the regular time interval (the memory information verification process time interval), error frequency data defining the maximum error generation times for allowing the data to be rewritten in the same sector address in the rewriting process at time of the error generation in the memory information verification process, and bit number data defining the maximum error bit number for allowing the data to be rewritten in the same sector address in the rewriting process at time of the error generation in the memory information verification process. The parameter data held in the parameter sector 32 is initially loaded in the mode register 25 of the MPU 11 in response to the initializing operation at the power-on resetting of the flash memory controller 4, or the like.

The memory information verification process will be generally explained with reference to FIG. 1. In response to the instruction for the start of the memory information verification process, the MPU 11 causes the flash interface circuit 12 to supply the read-control information to the flash memory 2 to read out the sector data Sn and management information Mn of the predetermined unit area BLK and then to store them in the data buffer 3. The MPU 11 causes the ECC circuit 14 to perform the error check to the read-out sector data Sn based on the corresponding ECC code (See routine (1) in FIG. 1).

Next, the MPU 11 reads the result of the error check from the ECC circuit 14 (see routine (2) in FIG. 1). When an error is detected in the ECC circuit 14, the MPU 11 determines whether or not the total number of error generation times as detected till then exceeds a predetermined value of generation times as held in the mode register 25, based on the number of generation times included in the management information Mn which corresponds to the read-out sector data. The predetermined value of generation times is a value indicated by the data of generation times held in the parameter area 32, for example. The data of generation times is initially loaded in the mode register 25 at the initializing operation of the flash memory controller 4. Alternatively, the MPU 11 determines whether or not the number of error bits as detected by the ECC circuit 14 exceeds the predetermined bit number as held in the mode register 25. The predetermined bit number is a value indicated by the bit number data as held in the parameter area 32, for example. The bit number data is initially loaded in the mode register 25 at the initializing operation of the flash memory controller 4. Naturally, the number of error bits indicated by the bit number data is not larger than the maximum number of error bits correctable by the ECC circuit 14. After the MPU 11 applies the error correction to the data stored in the data buffer 3, when the number of error generation times or the number of error bits is not larger than the value as initially loaded in the mode register, the data is rewritten in the same location (see routine (3) in FIG. 1). When the number of error generation times or the number of error bits exceeds the value as initially loaded in the mode register, the data is rewritten in the substitution area (see routine (4) in FIG. 1). When the data is rewritten, the flash interface circuit 12 gives the rewrite-control information to the flash memory 2.

Figure 3:
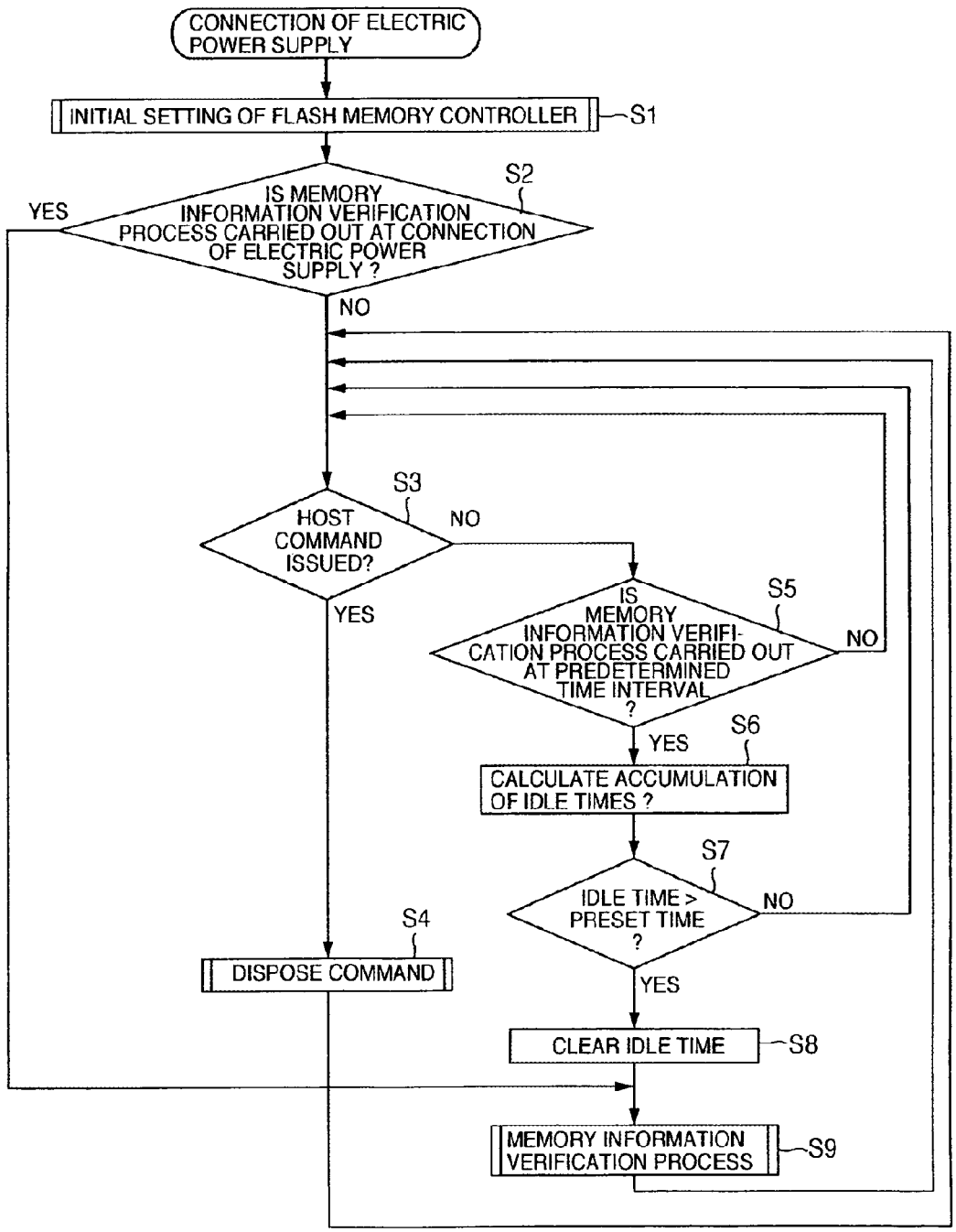
FIG. 3 is a flow chart showing one example of a starting procedure in a memory-information verification process.

FIG. 3 shows one example of a starting procedure of the memory information verification process. At the connection of electric power supply, the flash memory controller 4 is initialized (S1). At the initializing operation, for example, the parameter as held in the parameter sector 32 of the flash memory 2 is initially loaded in the mode register 32. Then, it is judged based on the value of the first enable bit in the mode register 25 whether or not the memory information verification process is to be carried out at the connection of electric power supply (S2).

When the memory information verification process is not carried out at the connection of electric power supply, it is judged whether or not a host command for access to the memory card is issued from the host computer (S3). When the command is issued, the command is disposed (S4) and the process is again returned to the step S3.

When the host command is not issued at the step S3, it is judged based on the value of the second enable bit whether or not the memory information verification process is to be carried out at regular time intervals (S5). When the process is carried out at a predetermined time interval, the accumulation of the idle times is calculated (S6). That is, the time interval in which the MPU 11 is not working for the host command is measured by using the timer 26 of the MPU 11. It is judged whether or not the accumulated idle time exceeds a preset time, i.e. the time indicated by the time information as initially loaded in the mode register 25 (S7). When the former exceeds the latter, the idle time accumulated by the timer is cleared (S8), and then the memory information verification process is carried out (S9). When the first enable bit is "enable" at the step (S2), the memory information verification process is first carried out (S9).

Figure 4:
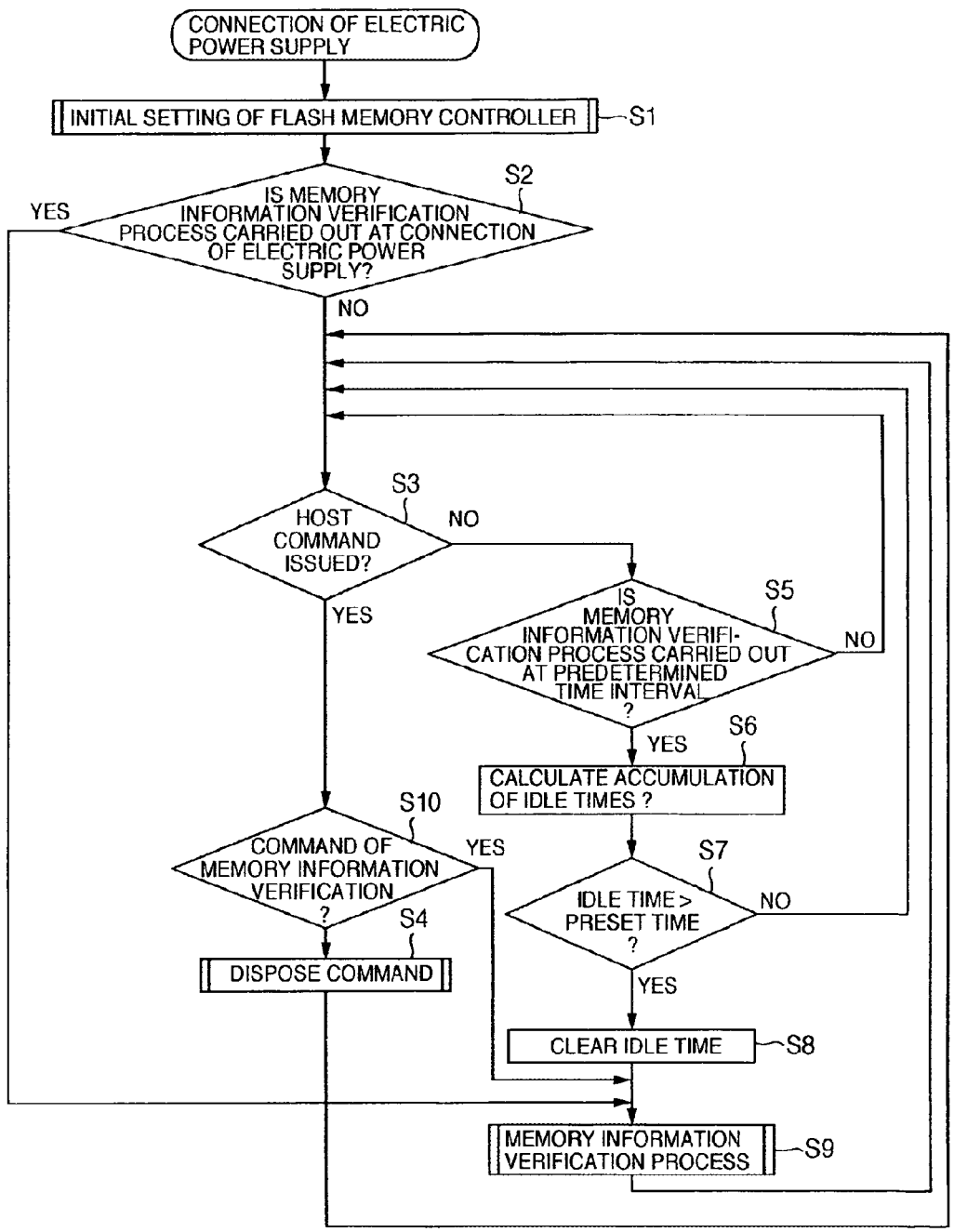
FIG. 4 is a flow chart showing another example of the starting procedure in the memory-information verification process.

FIG. 4 shows another example of the starting procedure of the memory information verification process. This procedure is different from that in FIG. 3 in that the command for the memory information verification process can be indicated by a command from the host computer. That is, the memory information verification starting command is issued at the step S10 following the step S3. When detecting this command, the memory information verification process is carried out (S9).

Figure 5:
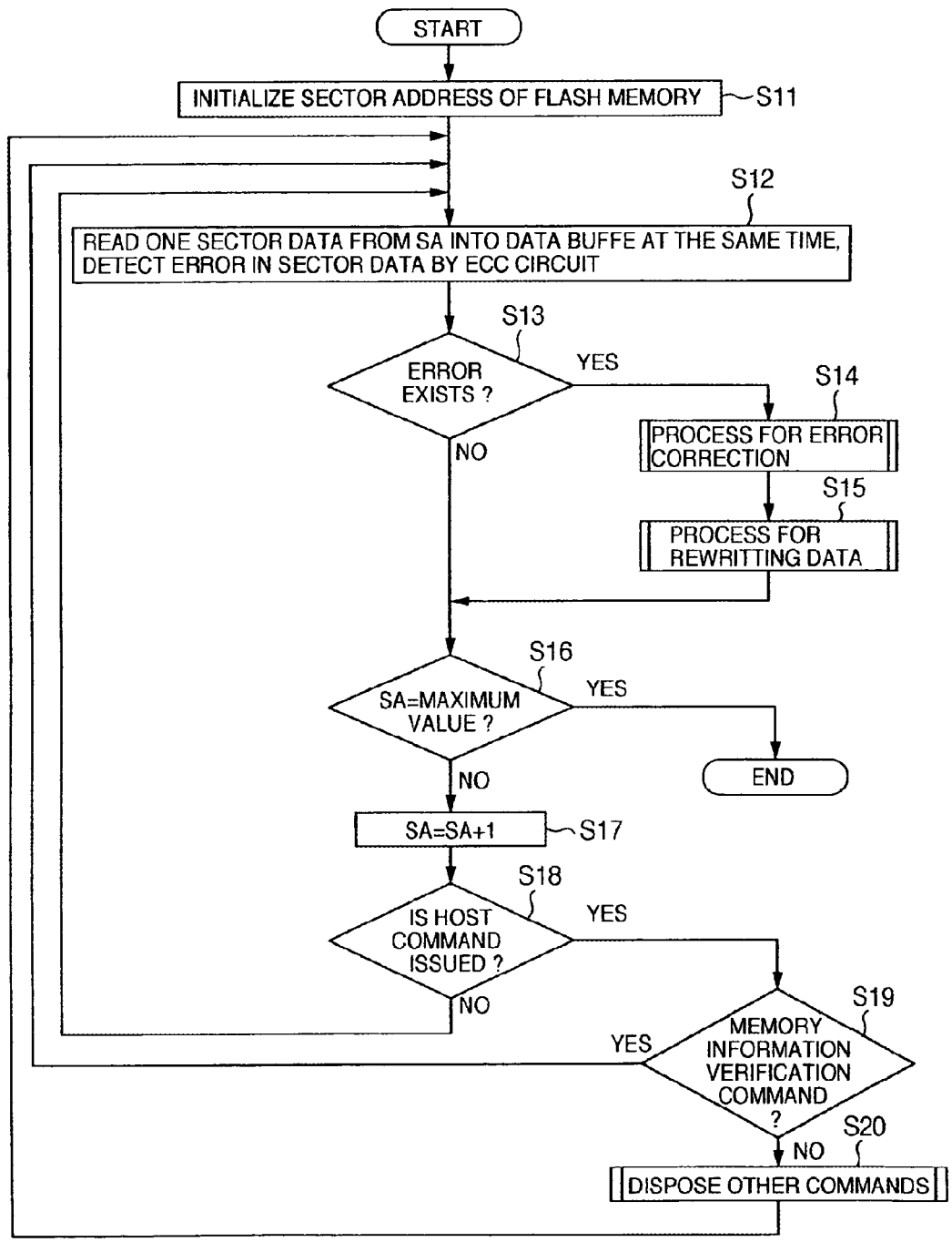
FIG. 5 is a flow chart showing one example of the memory-information verification process.

FIG. 5 shows one example of a flow chart of the memory information verification process S9. First, for example, one of the general-purpose registers in the CPU 27 is used for a sector address counter SA of the flash memory, and is initialized (S11). The sector address of the flash memory is an address (physical address) indicating the data stored in the flash memory. The sector address corresponds to the logical address designated by the host computer. Next, the corresponding sector data is read out into the data buffer 3 based on the value of the sector address counter SA. At the same time, the ECC circuit 14 is caused to apply the error detection to the sector data by using the ECC code corresponding to the sector data (S12). The CPU 27 judges based on the result of the error detection whether or not an error exists. When an error is detected, the error is corrected by the ECC circuit 14 (S14), and the process is carried out to rewrite the corrected data into the flash memory (S15). As the data correction process, the well-known correction technique as used to BCH (Bose-Chaudhuri-Hocquenghen) symbol, Lead Solomon symbol or the like may be used. When the value of the sector address counter SA is not maximum (S16), "1" is added to the value of the sector address counter SA (S17), and the presence of the host command issue is checked (S18). When the host command is not issued, the process is returned to the step S12 to repeat the similar process. When the host command is issued, the process is returned to the step 12 to repeat the similar process if the command is for the memory information verification process. If the command is for other process, it is allowed to perform that command (S20), and when the host computer issues a command during the memory information verification process, a priority is given to the deposition of that command. When the value of the sector address counter SA reaches the final value (maximum value) at the step S16, it means that the memory information verification process is applied through one round to the flash memory 2, and hence the memory information verification process S9 is finished.

Figure 6:
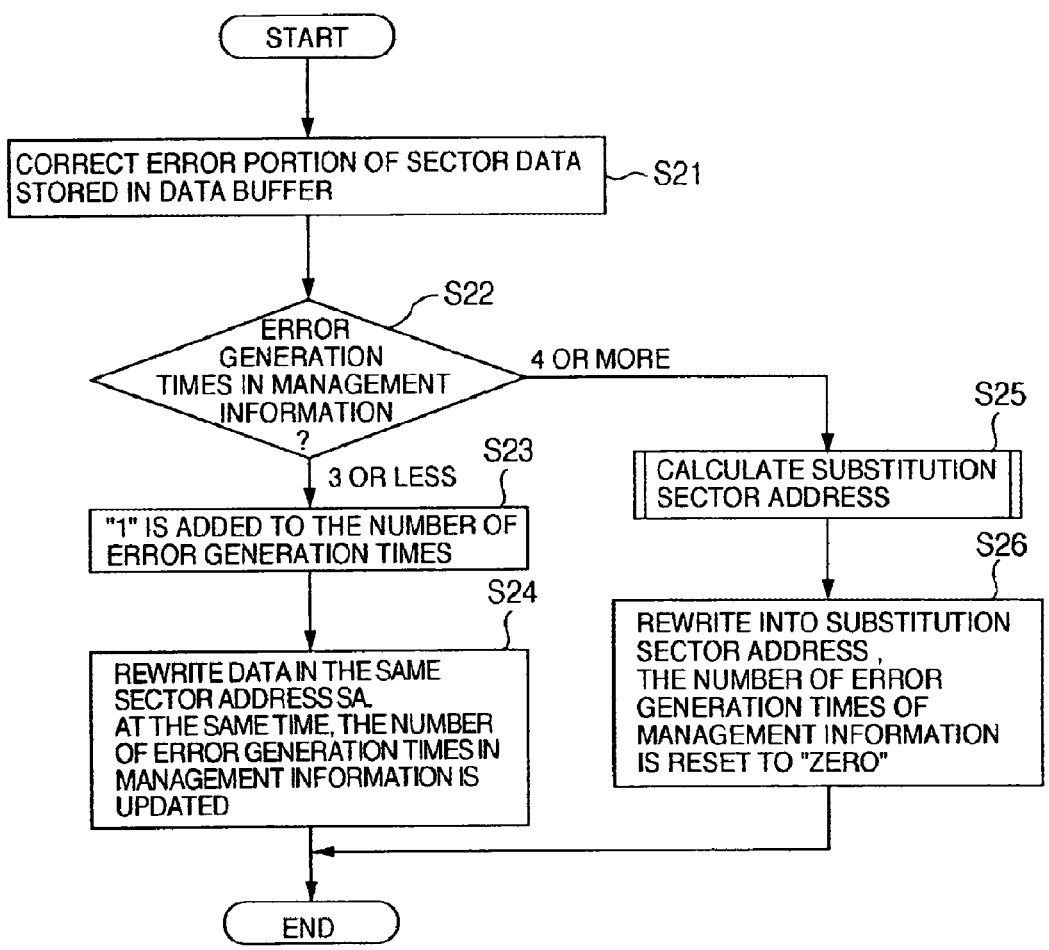
FIG. 6 is a flow chart showing one example of a rewriting process in which rewriting location is exchanged depending on the number of error generation times.

FIG. 6 shows one example of a flow chart of the rewriting process S15. The process shown in the drawing is an example in which the rewriting location is exchanged depending on the number of error generation times. First, the error portion of the sector data stored in the data buffer 3 is corrected (S21). At the time, it is judged whether or not the number of the error generation times in the sector exceeds the maximum value (for example, four times) of the mode register (S22) as a result of the error generation at this time. When the value is three or less, "1" is added to the number of error generation times (S23), and the error-corrected sector data is rewritten in the sector of the sector address counter SA (S24). The number of error generation times in the management information corresponding to that sector is updated. When the number of error generation times is four or more, the substitution sector address is calculated (S25), and the error-corrected data is rewritten into the calculated substitution sector address (S26). At this time, the number of error generation times in the management information of that substitution sector is reset to "0". The calculation of the substitution sector address is performed such that the substitution area is scanned to detect an unoccupied sector, and then the first detected unoccupied sector is determined as the substitution sector.

Figure 7:
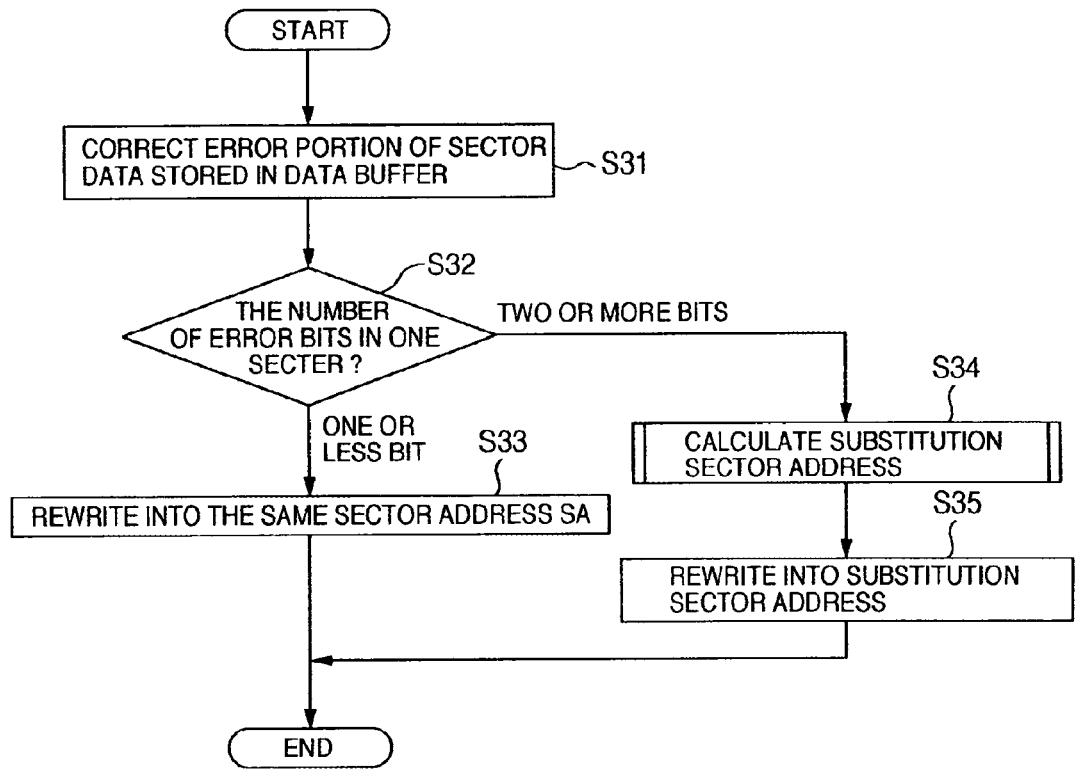
FIG. 7 is a flow chart showing another example of the rewriting process in which the rewriting location is exchanged depending on the error-bit number.

FIG. 7 shows one example of another flow chart of the rewriting process S15. The process shown in the drawing is an example in which the rewriting location is exchanged depending on the number of error bits. First, the error portion of the sector data stored in the data buffer 3 is corrected (S31). At this time, it is judged whether or not the number of error bits of that sector is equal to or larger than the maximum value (for example, 2 bits) in the mode register (S32) as a result of the error generation at this time. When the number of error bits is one or less, the error-corrected sector data is rewritten into the sector of the sector address counter SA (S33). When the number of error bits is two or more, the substitution sector address is calculated (S34), and then the error-corrected sector data is rewritten into the calculated substitution sector address (S35). The calculation of the substitution sector address is performed such that the substitution area is scanned to detect an unoccupied sector, and then the first detected unoccupied sector is determined as the substitution sector.

Figure 8:
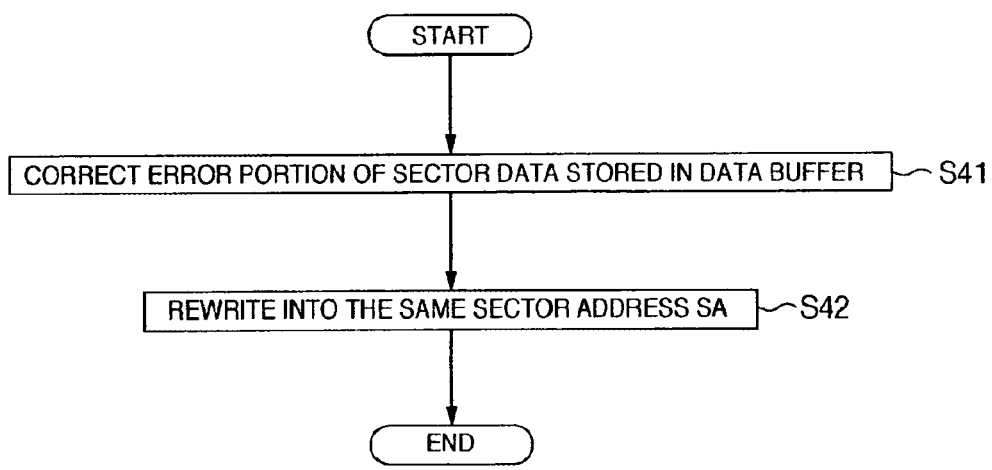
FIG. 8 is a flow chart showing a further different example of the rewriting process in which data is always rewritten in the same sector as a read sector.

FIG. 8 shows one example of a further different flow chart of the rewriting process S15. The process shown in the drawing is an example in which the data is always rewritten into the same sector as the read-out sector. The error portion of the sector data stored in the data buffer 3 is corrected (S41). Then, the error-corrected sector data is rewritten into the sector of the sector address counter SA (S42).

Figure 9:
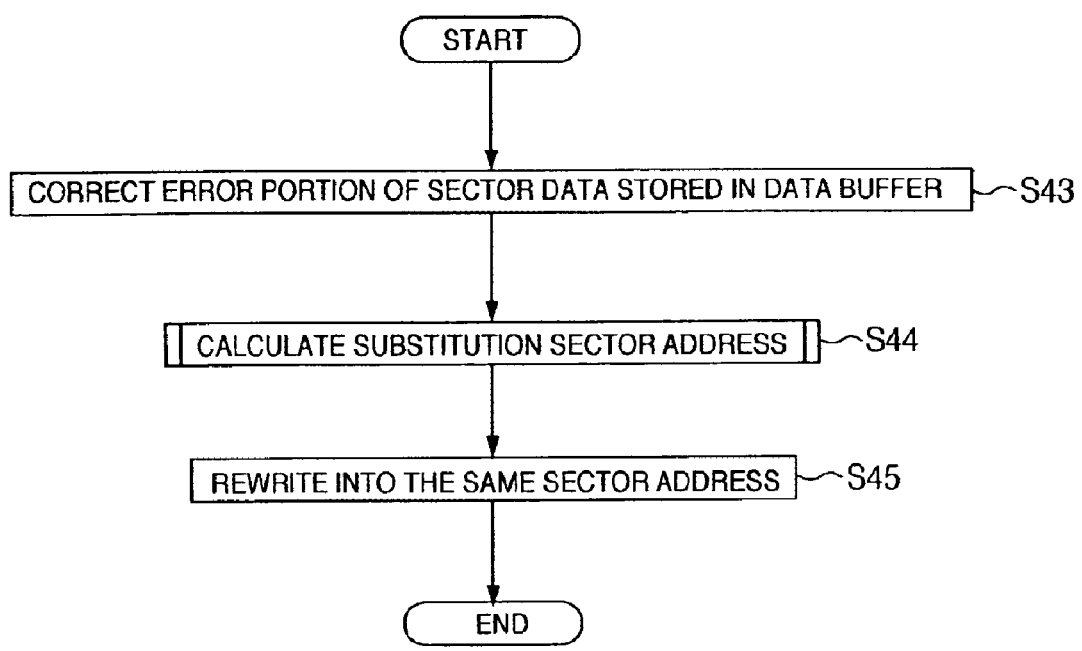
FIG. 9 is a flow chart showing a still further different example of the rewriting process in which data is always rewritten in a sector different from the read sector.

FIG. 9 shows one example of a still further different flow chart of the rewriting process S15. The process shown in the drawing is an example in which the data is always rewritten into the substitution sector different from the read-out sector. The error portion of the sector data stored in the data buffer 3 is corrected (S43). Then, the substitution sector address is calculated (S44), and the error-corrected sector data is rewritten into the calculated substitution sector address (S45).

Figure 10:
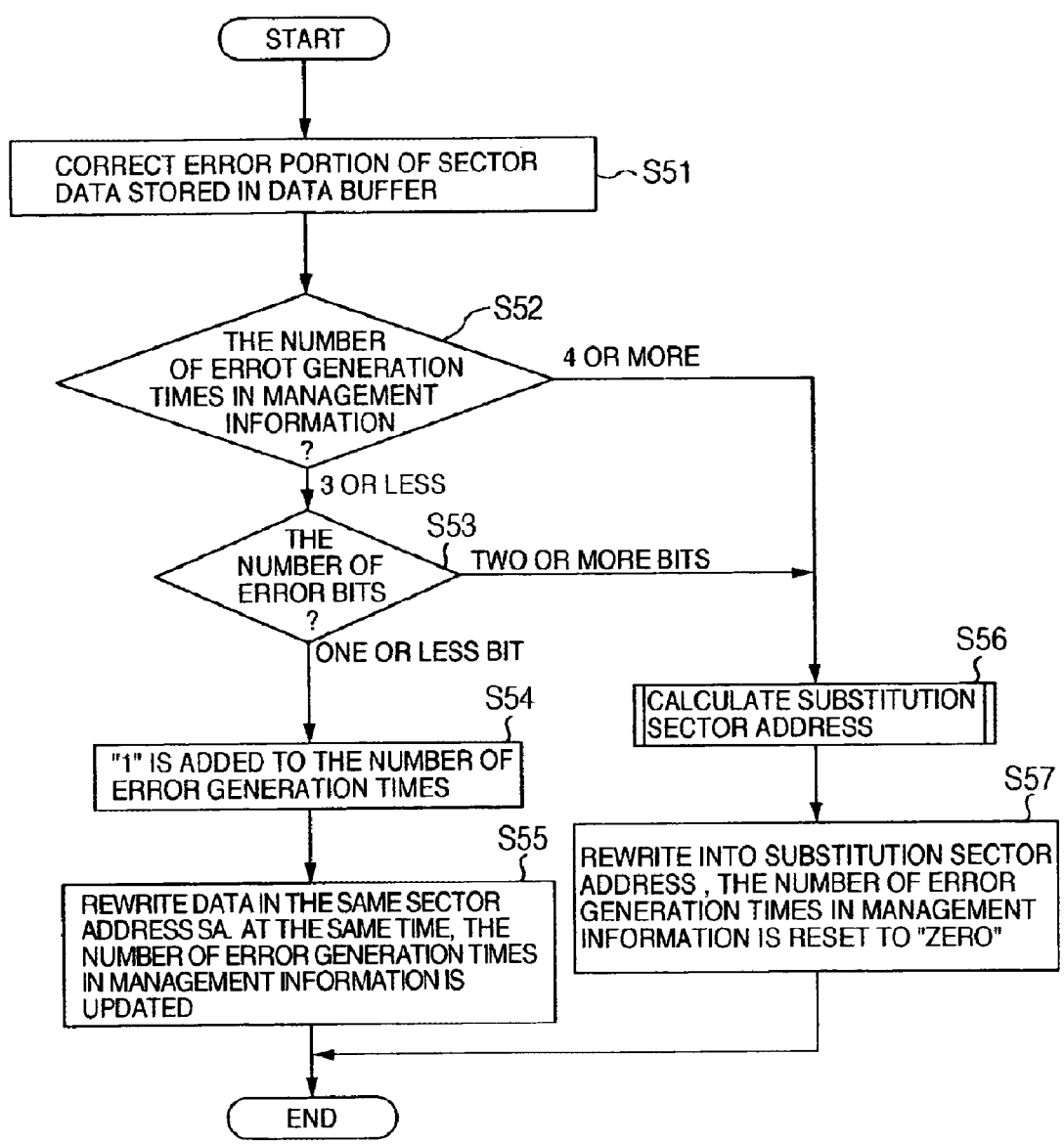
FIG. 10 is a flow chart showing a still further different example of the rewriting process in which the rewriting location is exchanged depending on both of the number of error generation times and the error-bit number.

FIG. 10 shows one example of a still further different flow chart of the rewriting process S15. The process shown in the drawing is an example in which the rewriting location is exchanged depending on both of the number of error generation times and the number of error bits. First, the error portion of the sector data stored in the data buffer 3 is corrected (S51). At this time, it is judged whether or not the number of error generation times in the sector is equal to or larger than the maximum value (for example, four) of the mode register (S52) as a result of the error generation at this time. When the number is three or less, it is judged whether or not the number of error bits is equal to or more than the maximum value (for example, 2 bits) of the mode register (S53) as a result of the error generation at this time. When the number is one bit or less, "1" is added to the number of error generation times (S54), and then the error-corrected sector data is rewritten into the sector of the sector address counter SA (S55). The number of error generation times in the management information corresponding to that sector is updated. When the number of error bits is two or more bits, the substitution sector address is calculated (S56), and then the error-corrected sector data is rewritten into the calculated substitution sector address (S57). At this time, the number of error generation times in the management information of the substitution sector is reset to "zero".

As above-mentioned, the flash memory controller 4 performs the error detection and correction for the memory information independently of reading-out of the memory information according to an external access request. Therefore, it is possible to improve the reliability of data retention in the flash memory 2 without the host computer 16 reading out the memory information from the flash memory 2 of the memory card 1. By conducting this data verification at regular time intervals, the data can be maintained always correctly by compensating for the variation of the data by aging thereby securing the reliability of data. Even when the flash memory of which the stored data is generally greatly changed by aging is used, it is possible to secure the reliability of the data in the flash memory by conducting the data verification at regular time intervals.

In the above error detection and correction process, as the number of error correction times (i.e., the number of error generation times) is larger, the possibility that the uncorrectable error is generated becomes more great. In the present invention, since the sector to which the error-corrected sector data is rewritten is changed to the sector in the substitution area when the total number of error generation times and/or the number of error bits reaches a predetermined value, it is possible to take the necessary procedure before generation of the uncorrectable error.

By holding the parameters of the information of the predetermined times or the like, which is used for the error detection and correction process, into the parameter sector in non-volatile condition, the information is not lost at the stoppage of power supply.

Further, the MPU 11 records the number of error generation times produced in the error detection and correction process in the corresponding data area in the flash memory 2, and hence it is possible to make easy the management of information of the number of error generation times in each predetermined memory area such as a unit of sector.

In the above, the present invention made by the inventors has been described in detail based on the embodiments thereof. But the invention is not limited thereto and it is apparent that various modifications are included in the scope of the present invention without deviating from the gist of the invention.

For example, the sector data in the unit area BLK of the flash memory is not limited to the volume of one sector, but information of four sectors or the like can be stored in the unit area. The non-volatile memory is not limited to the flash memory, but may be a ferroelectric memory. Further, the flash memory controller may be formed on one chip or multi-chip. The error detection and correction process is not necessarily carried out by the ECC circuit differently from the MPU circuit, but may be carried out by a CPU and its software (operation program). Further, the start of the memory information verification process is not limited to the combination of the connection time of electric power supply, the time determined by regular time intervals and the instruction by the host command, but may be any suitable combination or any one of them. Further, it is possible to use other events as a start trigger.

The advantages obtained by the typical embodiments of the present invention as disclosed are as follows.

By conducting the verification of the data stored in the non-volatile memory (irregardless of the operation of the host computer), it is possible to detect the data variation in the non-volatile memory produced by aging and to rewrite the data in the non-volatile memory after correcting the error, it is possible to secure the reliability of the data. Further, by conducting the data verification at regular time intervals, it is possible to always maintain the data at normal state by preventing the data from being changed by aging, thereby securing the reliability of the data. Even when using a non-volatile memory of which the stored data is very likely to suffer from variation by aging, the reliability of the data can be secured by conducting the verification of the data stored in the non-volatile memory at regular time intervals.

It is possible to improve the reliability in data retention of the non-volatile memory without the host computer reading-out the data from the non-volatile memory of the memory card.

Also, it is possible to realize the improvement of reliability of data retention in the non-volatile memory in the memory card with less burden on the host device.

The invention claimed is:

1. A memory storage device comprising:
a flash memory;
control means for controlling an operation of said flash memory; and
an interface unit configured to couple said control means to a host device,
wherein said memory storage device is configured such that, while a power supply voltage is supplied from the host device after completion of an initial operation of said memory storage device, said control means carries out a first error check operation to said flash memory in response to first control information stored in said flash memory, autonomously and irrespectively of the host device,
wherein said flash memory stores a predetermined error frequency value, and
wherein data of said flash memory can be corrected when an error frequency resulting from said first error check operation is equal to or less than said predetermined error frequency value.

2. The memory storage device according to claim 1, wherein said control means includes a register configured to store said predetermined error frequency value read from said flash memory.

3. The memory storage device according to claim 2, wherein, in said initial operation of said memory storage device, said control means carries out a second error check operation to said flash memory in response to second control information stored in said flash memory, and
wherein said initial operation is carried out in response to starting of supply of said power supply voltage from the host device.

4. The memory storage device according to claim 3, wherein said first error check operation and said second error check operation use an error correction code stored in said flash memory.

5. The memory storage device according to claim 4, wherein said memory storage device is configured such that said error correction code is stored in said flash memory in response to a data storing instruction from the host device.

6. The memory storage device according to claim 5, wherein said control means is configured to carry out a data read error check operation to said flash memory using said error correction code in response to a data read operation, which is performed in response to receiving a read instruction from the host device.

7. The memory storage device according to claim 6, wherein when said control means is configured to detect an error in data read out from a first area of said flash memory in said first error check operation, said control means also being configured to write said read out data, whose error is corrected, to a second area of said flash memory.

8. A memory storage device comprising:
a flash memory;
control means for controlling an access operation to said flash memory; and
an interface circuit configured to couple said control means to a host device,
wherein said memory storage device is configured such that, while a power supply voltage is supplied from the host device after completion of an initial operation of said memory storage device, said control means carries out an error check operation to data stored in said flash memory one or more times, autonomously and irrespectively of the host device,
wherein said flash memory stores a predetermined error frequency value, and
wherein data of said flash memory can be corrected when an error frequency resulting from said error check operation is equal to or less than said predetermined error frequency value.

9. The memory storage device according to claim 8, wherein said control means includes a register configured to store said predetermined error frequency value read from said flash memory.

10. The memory storage device according to claim 9, wherein said control means is configured to carry out said error check operation when reading data from a first area of said flash memory in response to receiving a read instruction accompanied by address information specifying said first area of said flash memory from the host device.

11. The memory storage device according to claim 10, wherein said control means is configured to control storing of data and an error correction code, which is generated in accordance with said data, to said flash memory in response to receiving a write instruction accompanied with said data from the host device, and
wherein said control means is configured to carry out said error check operation using said error correction code.

\* \* \* \* \*